H. ALINDER.
FILTER.
APPLICATION FILED FEB. 15, 1911.
1,084,383.
Patented Jan. 13, 1914.
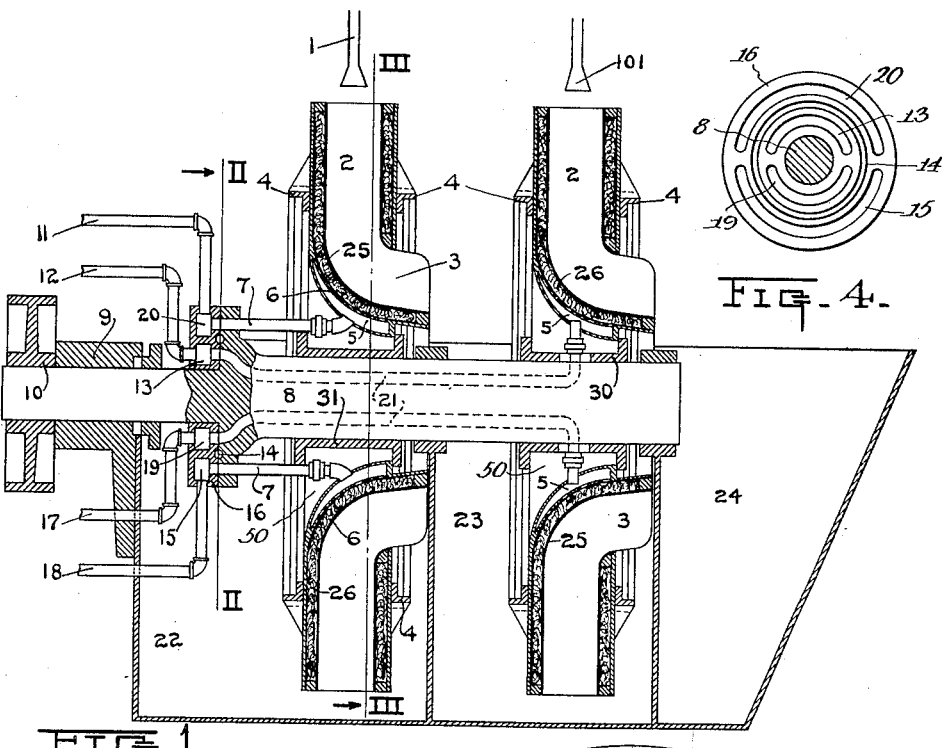
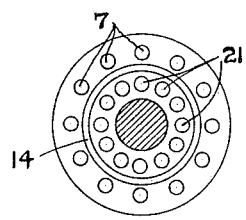
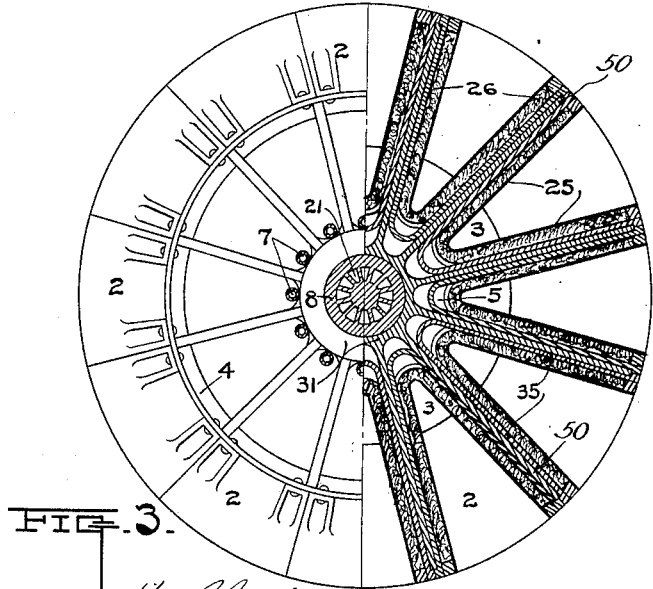
WITNESSES
W H Lieber
Ella Brickell
INVENTOR
H. Alinder
BY
ATTORNEY

UNITED STATES PATENT OFFICE.

HENRY ALINDER, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

FILTER.

1,084,383. Specification of Letters Patent. Patented Jan. 13, 1914.

Application filed February 15, 1911. Serial No. 608,659.

*To all whom it may concern:*

Be it known that I, HENRY ALINDER, a subject of the King of Sweden, residing at Milwaukee, in the county of Milwaukee and State of Wisconsin, have invented a certain new and useful Improvement in Filters, of which the following is a specification.

This invention relates to improvements in the construction of continuous rotary filters for use in the treatment of metallurgical slimes or similar substances.

The object of the invention is to provide a continuous rotary filter which is simple in construction and which has the maximum capacity for minimum amount of space occupied.

In the treatment of metallurgical slimes it is essential to provide a means for successively treating and filtering the slimes until all of the values have been extracted therefrom.

It is an object of this invention to provide a simple means for thus successively filtering the slimes.

A clear conception of one embodiment of the invention can be obtained by referring to the accompanying drawing in which like reference characters designate the same or similar parts in the various views.

Figure 1 is a transverse, central vertical section through a filter having two filtering drums. Fig. 2 is a section through the shaft of the filter showing the solution outlets therefrom, the section being taken on the line II—II of the filter shown in Fig. 1 looking in the direction of the arrow. Fig. 3 is an end view partly in section, of one of the drums of the filter shown in Fig. 1, the section being taken along the line III—III looking in the direction of the arrow. Fig. 4 is a section through the shaft of the filter, showing the discharge ports and stationary discharge casing, the section being taken on the line II—II of the filter shown in Fig. 1 looking toward the left.

Each of the filter drums consists essentially of two circular frames 4 mounted upon central hubs 30, 31, the frames 4 being supported from the hubs by means of series of radial arms. The hubs 30, 31, are fixed to the main filter shaft 8 in any suitable manner, as by shrinking or keying. The frames 4 are spaced from each other by means of radially projecting ribs 50 which are formed integral with the hubs 30, 31, and project some distance beyond the peripheries of the frames 4 as clearly shown in Fig. 3.

The pocket filter cells 2 are wedge shaped and have sheet metal frames 35 which closely fit the radially projecting ribs of the hubs 30, 31. The outer ends of the cells 2 are open thereby producing an open periphery for the filter drum; that is, the cells 2 are outwardly open for inlet of slime to the interior thereof. The sheet metal frames 35 of the pocket cells 2 are lined with a filler 26 which may be either cocoa matting, corrugated wood, or other suitable material. The filler 26 is lined with a filtering medium 25, such as canvas, the filtering medium being supported by the filler which however, permits the withdrawal of liquid through the filtering medium 25. The lower extremities of the cells 2 are provided with liquid receiving chambers 5, these chambers being formed intermediate the ends of the frame 35 and the perforated supporting screens 6 which support the filler 26 and prevent same from filling the chambers 5. Discharge openings 3 are formed at the inner ends of the pocket filter cells 2 and are directed longitudinally of the supporting shaft 8 of the hubs 30, 31; that is, the cells 2 are inwardly open for cake discharge. The discharge spouts, having the openings 3 formed thereon, terminate in a plane substantially coincident with the plane of the inner wall of the tank into which the drum extends. The cells 2 are so formed that they can be easily removed from the filter frames by lifting them away from the shaft until the discharge spouts come in contact with the frame 4 and swinging the cell thus positioned through an angle of 90 degrees after which withdrawal thereof is unobstructed.

The main filter shaft 8 is mounted in suitable bearings above a liquid containing receptacle or tank. This receptacle or tank is shown as composed of three compartments 22, 23, 24. Such construction is however, not essential since as many compartments and filter drums as desired may be used. The overhanging end of the shaft 8 adjacent the shaft supporting bearing 9, is provided with a suitable driving pulley 10 which derives its power from any suitable source, not shown.

The interior of the shaft 8 is provided with passages 21 of a number equal to the number of cells on the second filtering drum. The passages 21 connect with the chambers 5 of the pocket filtering cells 2 and emerge from the shaft 8 at their opposite ends through an enlargement or flange. Pipes 7 connect the chambers 5 of the first filter drum with the enlargement or flange of the shaft 8 and emerge from this flange at the same plane from which the passages 21 emerge. Packing devices 14 may be used at this plane of coacting surfaces. The receiving casing 16 is provided with conduits 20, 15, which are adapted to be brought in connection with the pipes 7 leading from the first drum, see Fig. 4. Similar conduits 13, 19, are formed in the receiving casing 16 and are adapted to connect with the passages 21. The lower conduits 15, 19, connect with vacuum pipes 18, 17, respectively, these conduits therefore being known as the vacuum conduits. The conduits 15, 19, are of such length that the chambers 5 of the cells 2 will be connected with the vacuum during their entire passage through the liquid contained in the liquid receptacles. The upper conduits 13, 20, connect with fluid pressure pipes 12, 11, respectively, and are therefore known as the pressure conduits. The conduits 13, 20, are of such length that the pipes 7, 21, are in connection therewith during the passage of the filter cells through the space above the liquid in the receptacles 22, 23.

Spray nozzles 1, 101, are located above the first and second filtering drums respectively and are so placed that wash water for the cells 2 can be admitted at the desired time. The spray nozzles 1, 101, may be under control of valves if so desired, such construction being omitted from the disclosure since it forms no part of the present invention.

During the operation of the filter the slime or material to be filtered is admitted to the first or strong solution chamber 22. As the successive cells 2 of the first filter drum enter the liquid in the chamber 22, said immersion being the result of slow rotation imparted to the shaft 8, their corresponding chambers 5 are brought in connection with the vacuum conduit 15 through the pipe 7. This submerging of the cells 2 and simultaneous placing of the same under vacuum causes liquid to be drawn through the filtering medium 25, filler 26, to the chamber 5 from whence it is discharged through the pipe 7, chamber 15 and pipe 18.

As the detachable pocket filter cells 2 leave the liquid in the chamber 22, the pipe 7 corresponding to the emerging cell is brought in connection with the high pressure conduit 20 in which air or similar fluid under pressure is maintained. This high pressure air flows through the pipe 7, chambers 5, and acts against the inner side of the filter medium 25, thus tending to dislodge the cake which has been formed on the cell 2 during the previous filtering operation. As the cells 2 advance with the rotation of the drum, the wash water is admitted through the nozzles 1 dislodging the cake and washing same through the discharge outlet 3 into the next succeeding liquid chamber 23. This discharge of the material into the chamber 23 is accomplished by the discharge spouts which are located very near the separating wall between the chambers 22, 23, and are directed toward the chamber 23.

As the detachable pocket filter cells 2 of the second filter drum enter the liquid in the weak solution chamber 23, their chambers 5 are brought in connection with the weak solution vacuum chamber 19 through the passages 21 formed in the shaft 8 and connecting with the chambers 5. The weak solution chamber 19 is kept under vacuum, the substances gathering therein being discharged through the pipe 17. The cells 2 are kept under vacuum until they leave the liquid in the weak solution chamber 23, filtration of the liquid taking place during the time that the cells are submerged and a thin cake of solid matter again collecting on the surface of the filtering medium 25. As the cells leave the liquid in the second chamber 23, their corresponding passages 21 are successively brought in connection with the pressure chamber 13. This causes pressure to be admitted on the inner side of the filtering medium 25 in opposition to the cake formed on the outer surface thereof, the result being that the cake is loosened as in the first filtering operation. Upon reaching a predetermined point in the revolution of the drum, the interior of the cells 2 of the second drum are subjected to the action of sprays from the nozzles 101. This washing or spraying removes the loosened cake from the filtering medium 25 and discharges same as a thickened liquid to the discharge chamber 24. The material thus discharged can be either continuously or intermittently discharged from the chamber 24 by any suitable means such as a conveyer, or it may be re-treated in a third filtering drum to produce a second weak solution.

It will be noted that with the construction of detachable filter cells 2 as disclosed, a large filtering area is obtained. This is an essential feature since the amount of filtration depends largely upon the area of the filtering surface exposed to the liquid. The filter is moreover continuous and automatic in its action since the handling of the materials is entirely mechanical after same has been admitted to the filter. The formation of independent detachable cells 2 provides a means whereby a portion of the filtering medium alone need be replaced thereby avoiding replacement of the entire medium in case only a small part becomes ineffective or worn.

It should be understood that it is not desired to be limited to the exact details of construction shown and described, for obvious modifications will occur to a person skilled in the art.

It is claimed and desired to secure by Letters Patent,—

1. In a filter, a tank, a shaft extending over said tank, a frame on said shaft extending into said tank, and an outwardly open detachable pocket filter cell supported in said frame and having a discharge spout terminating in a plane substantially coincident with the plane of the inner surface of a wall of said tank.

2. In a filter, a shaft, a frame mounted on said shaft, and a plurality of wedge shaped filter cells radially supported in said frame, said cells having inlet openings for slime at points remote from said shaft and having discharge openings for cake at points adjacent said shaft.

3. In a filter, a shaft, a frame on said shaft, and a plurality of detachable pocket filter cells outwardly open for slime inlet and inwardly open for cake discharge, radially supported in said frame.

4. In a filter, a tank, a rotatable shaft over said tank, a plurality of filter cells arranged around said shaft and forming outwardly open pockets, said pockets having discharge openings for cake at their inner ends whereby the cake is discharged over the side of the tank, and pipe connections from the interior of said cells.

In testimony whereof, I affix my signature in the presence of two witnesses.

HENRY ALINDER.

Witnesses:
CHAS. L. BYRON,
W. H. LIEBER.

---

Copies of this patent may be obtained for five cents each, by addressing the "Commissioner of Patents, Washington, D. C."